US012680928B2

(12) United States Patent
Lee et al.

(10) Patent No.:  US 12,680,928 B2
(45) Date of Patent:  Jul. 14, 2026

(54) THIN FILM SPECIMEN FOR TENSILE TEST AND PHYSICAL PROPERTY EVALUATION METHOD FOR THIN FILM SPECIMEN

(71) Applicant: LG ENERGY SOLUTION, LTD., Seoul (KR)

(72) Inventors: Han Sol Lee, Daejeon (KR); Jee Soon Choi, Daejeon (KR); Yong Seok Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 262 days.

(21) Appl. No.: 17/774,288

(22) PCT Filed: Dec. 24, 2020

(86) PCT No.: PCT/KR2020/019049
§ 371 (c)(1),
(2) Date: May 4, 2022

(87) PCT Pub. No.: WO2021/177569
PCT Pub. Date: Sep. 10, 2021

(65) Prior Publication Data
US 2022/0390337 A1  Dec. 8, 2022

(30) Foreign Application Priority Data
Mar. 4, 2020  (KR) ........................ 10-2020-0027190

(51) Int. Cl.
| | |
|---|---|
| *G01N 3/08* | (2006.01) |
| *G01B 11/16* | (2006.01) |
| *G01N 3/06* | (2006.01) |

(52) U.S. Cl.
CPC .............. *G01N 3/08* (2013.01); *G01B 11/16* (2013.01); *G01N 3/06* (2013.01);
(Continued)

(58) Field of Classification Search
CPC .... G01N 3/08; G01N 3/06; G01N 2203/0017; G01N 2203/0075; G01N 2203/0268;
(Continued)

(56) References Cited

U.S. PATENT DOCUMENTS

2012/0287248 A1  11/2012  Erdman III et al.

FOREIGN PATENT DOCUMENTS

| | | |
|---|---|---|
| CN | 102564282 A | 7/2012 |
| CN | 103091164 A | 5/2013 |

(Continued)

OTHER PUBLICATIONS

"Porosity variation of lithium-ion battery separators under uniaxial tension" by Wang et al. (Year: 2020).*

(Continued)

*Primary Examiner* — Xin Y Zhong
(74) *Attorney, Agent, or Firm* — Morgan, Lewis & Bockius LLP

(57) ABSTRACT

The present invention relates to a method for evaluating physical properties of a thin film specimen and a thin film specimen for a tensile test of the present invention, and according to the present invention, reliability of measured physical properties can be increased, and an abnormal damage of a thin film specimen can be suppressed by analyzing the strain rate of a speckle pattern formed on the thin film specimen by using a digital image correlation analysis scheme during a tensile test of the thin film specimen.

13 Claims, 8 Drawing Sheets

(52) U.S. Cl.
  CPC ................ *G01N 2203/0017* (2013.01); *G01N 2203/0075* (2013.01); *G01N 2203/0268* (2013.01); *G01N 2203/0282* (2013.01); *G01N 2203/0641* (2013.01); *G01N 2203/0652* (2013.01); *G01N 2203/0682* (2013.01)

(58) Field of Classification Search
  CPC ... G01N 2203/0282; G01N 2203/0641; G01N 2203/0652; G01N 2203/0682; G01N 2203/0647; G01N 15/0205; G01N 2203/00; G01B 11/16; G01B 11/165; Y02E 60/10
  See application file for complete search history.

(56) References Cited

FOREIGN PATENT DOCUMENTS

| | | | |
|---|---|---|---|
| CN | 107132086 | A | 9/2017 |
| CN | 107655756 | A | 2/2018 |
| CN | 109115597 | A | 1/2019 |
| CN | 109632484 | A | 4/2019 |
| JP | S60-3537 | A | 1/1985 |
| JP | H08-240517 | A | 9/1996 |
| JP | H09-101249 | A | 4/1997 |
| JP | 3236088 | B2 | 12/2001 |
| JP | 3478173 | B2 | 12/2003 |
| JP | 4560079 | B2 | 10/2010 |
| JP | 2012-159408 | A | 8/2012 |
| KR | 2002-0052868 | A | 7/2002 |
| KR | 2002-0083372 | A | 11/2002 |
| KR | 10-0742546 | B1 | 7/2007 |
| KR | 10-1189816 | B1 | 10/2012 |
| KR | 10-2016-0077704 | A | 7/2016 |
| KR | 10-1642047 | B1 | 7/2016 |
| KR | 10-1720845 | B1 | 3/2017 |
| KR | 10-1737028 | B1 | 5/2017 |
| KR | 10-1967820 | B1 | 4/2019 |
| KR | 10-2019-0097897 | A | 8/2019 |
| KR | 10-2043494 | B1 | 11/2019 |

OTHER PUBLICATIONS

"Standard Test Methods for Tension Testing of Metallic Materials" (Year: 2013).*

"Anisotropic viscoplasticity and fracture of fine grained metallic aluminum foil used in Li-ion batteries" by Bonatti et al. (Year: 2015).*

"Cutting Dies" (Year: 2018).*

"Standard Test Method for Tensile Properties of Plastics", D638 (Year: 2015).*

"Rubber, vulcanized or thermoplastic—Determination of tensile stress-strain properties", ISO-37 (Year: 2017).*

Extended European Search Report dated Nov. 28, 2022 issued in corresponding European Patent Application No. 20922682.8.

Wang, et al., "Porosity variation of lithium-ion battery separators under uniaxial tension," International Journal of Mechanical Sciences, 174 (2020) 165496.

Bonatti, et al., "Anisotropic viscoplasticity and fracture of fine grained metallic aluminum foil used in Li-ion batteries," Materials Science & Engineering A, 654 (2016), pp. 329-343.

ASTM International, "Standard Test Method for Tensile Properties of Plastics," Designation: D638-14, 2014, pp. 1-17.

RDM Test Equipment Ltd., "Cutting Dies—Tool steel (C0024)" retrieved from www.rdmtest.com/data/documents/products/65.pdf?33fb235396c052dee98f900b68039d35.

International Search Report (with partial translation) and Written Opinion dated Mar. 18, 2021, for corresponding International Patent Application No. PCT/KR2020/019049.

Office Action dated Jan. 9, 2025 issued in Chinese Patent Application No. 202080078016.8.

* cited by examiner

【FIG. 1】
-- Prior Art --
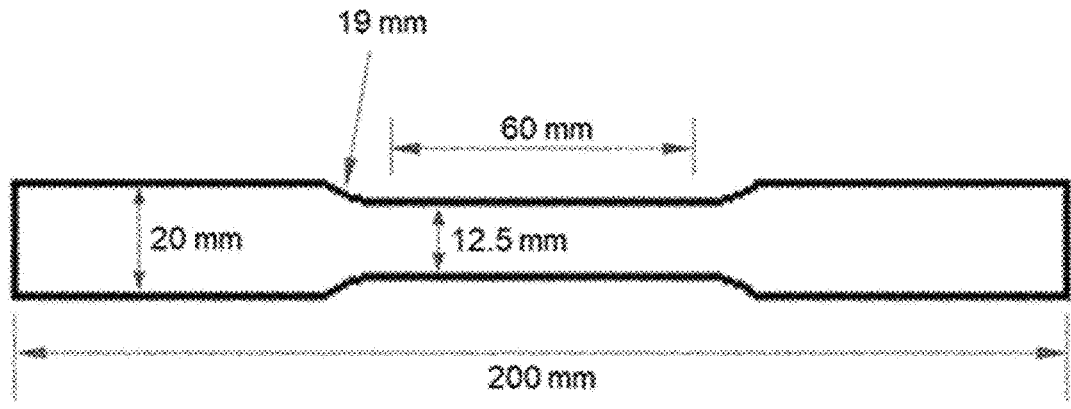

【FIG. 2】
-- Prior Art --
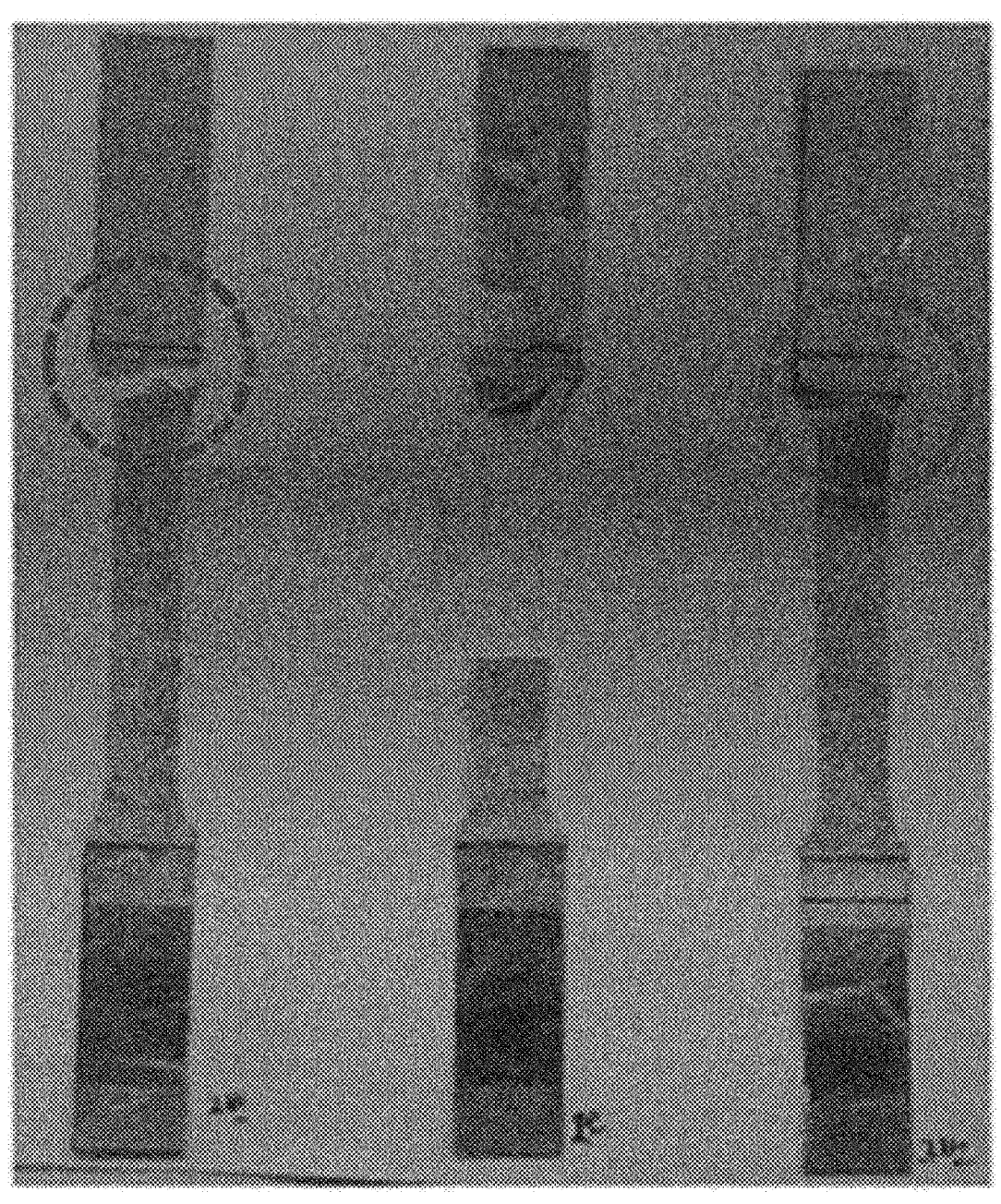

【FIG. 3】
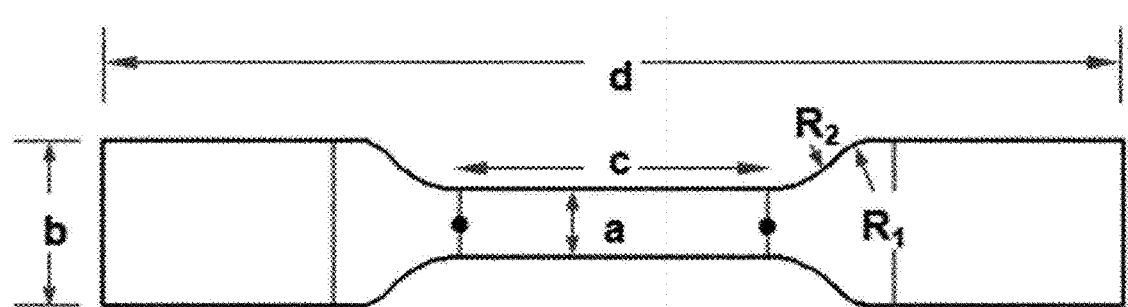

【FIG. 4】
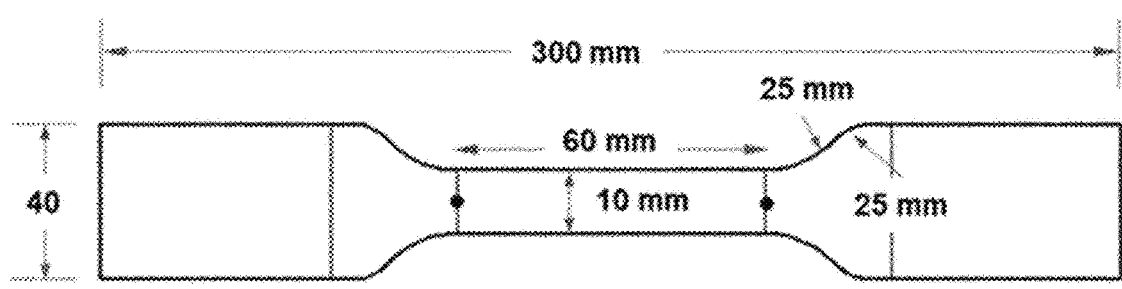

[FIG. 5]
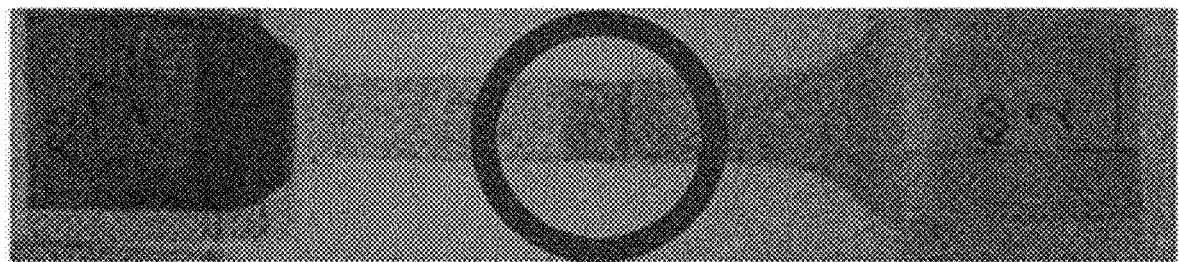

【FIG. 6】
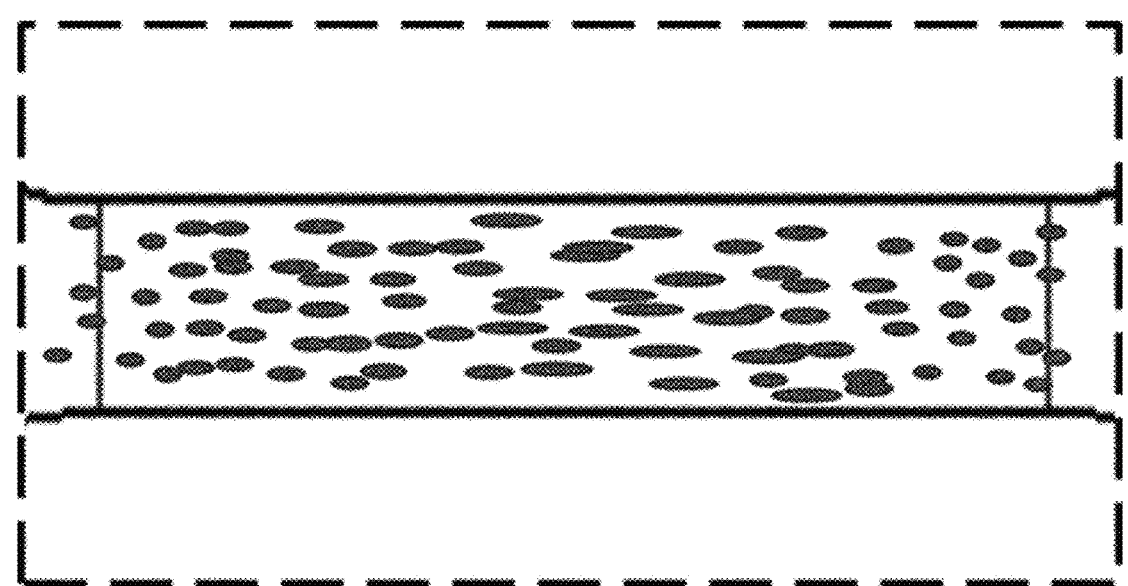

【FIG. 7】
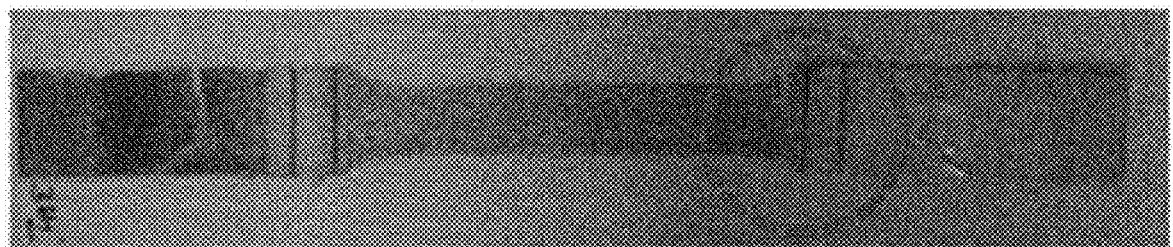

[FIG. 8]
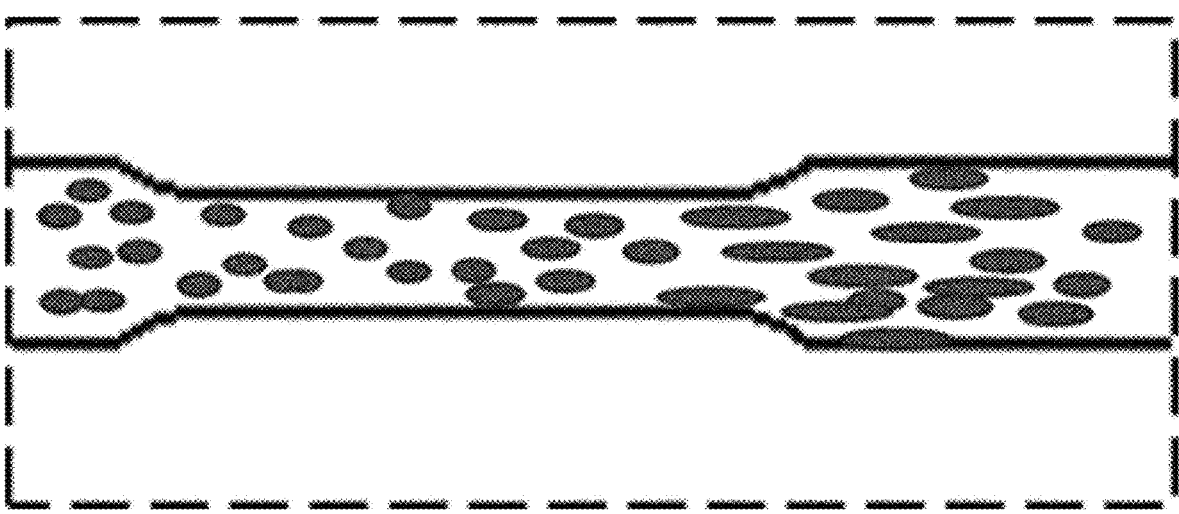

THIN FILM SPECIMEN FOR TENSILE TEST AND PHYSICAL PROPERTY EVALUATION METHOD FOR THIN FILM SPECIMEN

TECHNICAL FIELD

This application claims the benefit of priority based on Korean Patent Application No. 10-2020-0027190, filed on Mar. 4, 2020, and the entire contents of the Korean patent application are incorporated herein by reference.

The present invention relates to a method for evaluating physical properties of a thin film specimen and a thin film specimen for a tensile test, and more particularly, to a method for evaluating physical properties of a thin film specimen using a digital image correlation analysis, and a thin film specimen for a tensile test.

BACKGROUND ART

With the increase in technology development and demand for mobile devices, the demand for secondary batteries is also rapidly increasing. Among them, lithium secondary batteries are widely used as an energy source for various electronic products as well as various mobile devices because of their high energy density and high operating voltage and excellent storage and lifetime characteristics.

In addition, the secondary battery has attracted attention as an energy source of an electric vehicle, a hybrid electric vehicle, etc., which are proposed as a solution for air pollution of existing gasoline vehicles and diesel vehicles using fossil fuel. In order to be applied as an energy source of an electric vehicle, a high-power battery is required.

This secondary battery is being developed as a model capable of realizing high voltage and high capacity at the request of consumers. In order to realize high capacity, an optimization process of a positive electrode material, a negative electrode material, a separator, and an electrolyte solution, which are the four major elements of a secondary battery, is required within a limited space.

On the other hand, the electrode current collector of the secondary battery is made of a micrometer level of a thin film material. In the secondary battery manufacturing process, mechanical/environmental loads are applied to the electrode current collector, and thus the electrode current collector is sampled in the form of a specimen every time after a certain step and mechanical performance (physical properties) is evaluated to thereby determine whether there is a problem in the mechanical performance of a secondary battery which is the final product.

Typically, a short-axial tensile test method is widely used to evaluate the mechanical performance of the electrode current collector. Specifically, a tensile specimen is prepared in the form of a metal thin film tensile test specification (ASTM E345), and a tensile test is performed (FIG. 1). However, there is a problem that an abnormal material breakage is frequently caused by the characteristics of the thin film current collector specimen of a thickness of a μm level during a tensile test. This not only causes reducing the reliability of the physical properties of measurement, but also causes a problem of increasing the test costs and process time by increasing the number of tests for the SPEC in/out evaluation.

Therefore, there is a need for a specimen capable of suppressing an abnormal damage at the time of a tensile test for a current collector specimen and a method for easily evaluating physical properties of the current collector.

PRIOR ART LITERATURE (Patent Document 1) Japanese Patent No. 4560079

DISCLOSURE

Technical Problem

The present invention is intended to solve the above problems, and an object of the present invention is to provide a method for evaluating physical properties of a thin film specimen using a digital image correlation analysis, the method capable of suppressing an abnormal damage to the thin film specimen during a tensile test and increasing reliability of measured physical properties, and a thin film specimen for a tensile test.

Technical Solution

A method for evaluating physical properties of a thin film specimen according to the present invention includes: a step of measuring a tensile strength of a thin film specimen by applying tensile force in directions opposite to each other in a state that a grip portion of the thin film specimen having a speckle pattern is fixed; and a step of analyzing a strain rate of the speckle pattern while applying tensile force to the thin film specimen, wherein, in the thin film specimen on which the speckle pattern is formed, a length ratio (a:b) of a width (a) of a parallel portion to a width (b) of the grip portion is in a range of 1:2 to 6, and a length ratio (c:d) of a gauge length (c) of the thin film specimen to a total length (d) of the thin film specimen is in a range of 1:4 to 7.

In one example, the step of analyzing the strain rate of the speckle pattern includes: continuously and sequentially photographing a surface of thin film specimen with a camera; and analyzing the strain rate of the speckle pattern by using a digital image correlation (DIC) analysis scheme by comparing an image before photographing the surface with an image after photographing the surface.

In other example, the step of analyzing the strain rate includes: measuring a length strain rate (L/D) for a diameter of the speckle pattern. If "L" is a length of the speckle in a direction of the application of the tensile force, and "D" is a diameter of the speckle.

In further another example, the step of analyzing the strain rate includes: predicting a broken portion of the thin film specimen by distinguishing regions and comparing a length strain rate (L/D) for an area of the speckle pattern for each region.

Further, a width of a parallel portion of the thin film specimen is in a range of 8 to 12 mm, a gauge length of the thin film specimen is in a range of 50 to 70 mm.

In another example, the thin film specimen includes a first shoulder portion and a second shoulder portion where a curvature is formed on an outer surface and an inner surface between a parallel portion and a grip portion, respectively, and the first and second shoulder portions satisfy formula 1 below:

$$|R_1/R_2| \leq 0.1 \qquad \text{[Formula 1]}$$

Herein, $R_1$ represents a radius of curvature of the first shoulder portion and is in a range of 23 to 27 mm, and $R_2$ represents a radius of curvature of the shoulder portion and is in a range of 23 to 27 mm.

Further, a grip portion of the thin film specimen includes a non-slip protrusion, and a number of dots per $cm^2$ of the speckle pattern formed on the thin film specimen is in a range of 50 to 300.

In one example, the method further includes a step of forming a speckle pattern on a surface of the thin film specimen, and the step of forming the speckle pattern includes spraying a paint having a color, which is in contrast to a color of the thin film specimen, on the surface of the thin film specimen.

In another example, the speckle pattern formed on the thin film specimen has fluidity. Specifically, the method may include a step of measuring tensile strength of the thin film specimen within 3 to 10 minutes after forming a pattern by spraying paint on the surface of the thin film specimen.

In one example, the thin film specimen may be an electrode, a current collector or a separator of a secondary battery.

In addition, the present invention provides a thin film specimen for a tensile test. In one example, a thin film specimen for a tensile test according to the present invention is provided. Herein, a length ratio (a:b) of a width (a) of a parallel portion to a width (b) of a grip portion is in a range of 1:2 to 6, and a width of a parallel portion of the thin film specimen is in a range of 8 to 12 mm on average, a length ratio (c:d) of a gauge length (c) to a total length (d) of the thin film specimen is in a range of 1:4 to 7, and the gauge length of the thin film specimen is in a range of 50 to 70 mm on average, and a speckle pattern is formed on a surface of the thin film specimen.

In another example, the thin film specimen includes a first shoulder portion and a second shoulder portion where a curvature is formed on an outer surface and an inner surface between a parallel portion and a grip portion, respectively, and the first and second shoulder portions satisfy formula 1 below:

$$|R_1/R_2| \le 0.1 \qquad \text{[Formula 1]}$$

Herein, $R_1$ represents a radius of curvature of the first shoulder portion and is in a range of 23 to 27 mm, and $R_2$ represents a radius of curvature of the shoulder portion and is in a range of 23 to 27 mm.

In further another example, a speckle pattern formed on the surface of the thin film specimen in case of applying physical property evaluation has fluidity.

Advantageous Effects

According to a method for evaluating physical properties of a thin film specimen and a thin film specimen for a tensile test of the present invention, reliability of measured physical properties can be increased, and an abnormal damage of a thin film specimen can be suppressed by analyzing the strain rate of a speckle pattern formed on the thin film specimen by using a digital image correlation analysis scheme during a tensile test of the thin film specimen.

BRIEF DESCRIPTION OF THE DRAWINGS

FIG. 1 is a diagram showing a conventional ASTM E345 standard specimen for a metal thin film.

FIG. 2 is a photograph showing an abnormal breakage when a tensile test is performed using the ASTM E345 standard specimens shown in FIG. 1.

FIG. 3 is a schematic diagram showing a thin film specimen according to an embodiment of the present invention.

FIG. 4 is a diagram showing a specification of a thin film specimen prepared in Example 1.

FIG. 5 is a photograph showing a portion which has been broken when a tensile test for the thin film specimen of example 1 has been performed with a tensile tester.

FIG. 6 is a diagram illustrating a speckle pattern in a photograph taken right before the thin film specimen is broken.

FIG. 7 is a photograph showing a portion which has been broken when a tensile test for the thin film specimen of comparative example 1 has been performed with a tensile tester.

FIG. 8 is a diagram illustrating a speckle pattern in a photograph taken right before the thin film specimen is broken.

DETAILED DESCRIPTION OF THE PREFERRED EMBODIMENTS

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

The present invention relates to a method for evaluating physical properties of a thin film specimen by using a digital image correlation analysis, and a thin film specimen for a tensile test.

According to the present invention, it is possible to measure the strain rate for the diameter of the speckle pattern formed on a specimen by using a digital image correlation analysis scheme and predict the portion to be broken in the thin film specimen. Specifically, the digital image correlation analysis is a method capable of evaluating the displacement and strain rate in the specimen, and according to the digital image correlation analysis scheme, the digital image correlation before and after the deformation of the specimen can be identified using a function which is mathematically clear in its definition. Accordingly, it is possible to evaluate in the entire area of interest of the deformation.

Further, in the digital image correlation analysis scheme, the speckle pattern of the surface of the specimen can be obtained as a digital image by a CCD camera, and thus there is an advantage that an automatic and non-contact measurement is possible because the scheme is very simple compared to a typical visual measurement.

Particularly, according to a method for evaluating physical properties of a thin film specimen using a digital image correlation analysis, and a thin film specimen for a tensile test of the present invention, when a tensile test of a thin film specimen is performed, the reliability of the measured physical properties can be increased and an abnormal damage to the thin film specimen can be suppressed by analyzing the strain rate of the speckle pattern formed on the thin film specimen by using a digital image correlation analysis scheme.

Hereinafter, a method for evaluating physical properties of a thin film specimen by using a digital image correlation analysis, and a thin film specimen for a tensile test according to the present invention will be described in detail.

The method for evaluating physical properties of a thin film specimen by using a digital image correlation analysis according to the present invention includes a step of measuring a tensile strength of a thin film specimen by applying tensile force in directions opposite to each other in a state that a grip portion of the thin film specimen having a speckle pattern is fixed; and a step of analyzing a strain rate of the speckle pattern while applying tensile force to the thin film specimen.

In one example, a method for evaluating physical properties of a thin film specimen of the present invention further includes a step of forming a speckle pattern on the surface of the thin film specimen.

In the present invention, forming a speckle pattern means forming a dot pattern such as small spots on a thin film specimen by spraying a pigment such as paint. Hereinafter, a method of forming a speckle pattern is described in detail.

The thin film specimens may be a thin metal thin film specimen having a thickness of 0.5-30 μm, and may be a metal thin film of the electrode, the current collector or the separator material of the secondary battery. Generally, in a process of manufacturing a secondary battery, a metal thin film is sampled in the form of a specimen after each specific step and mechanical performance (physical properties) is evaluated, to thereby check whether there is a problem in mechanical performance of a secondary battery which is a final product. According to the present invention, whether there is a problem in the mechanical performance of the secondary battery can be evaluated by manufacturing an electrode, a current collector or a separator of a secondary battery and evaluating mechanical performance using the thin film specimen. The electrode may be a specimen to which a double-sided coating is applied. For example, it may mean an electrode of a coating layer/current collector/ coating layer structure.

The step of forming a speckle pattern on the surface of the thin film specimen is for forming a speckle pattern by dots on the surface of the thin film specimen, and paint such as oil paint may be sprayed. At this time, it is preferable that the paint sprayed on the thin film specimen has a color in contrast to a color of the thin film specimen. For example, a white paint may be sprayed on a black electrode (electrode coating layer), and a black paint may be sprayed on a white separator. Further, a speckle pattern can be formed by spraying white paint on a current collector such as aluminum or an aluminum alloy to thereby be uniformly applied to the surface of the specimen, and completely drying it and spraying black paint.

Further, paint for forming the speckle pattern is not entirely applied on the specimen, and it is preferred that the paint is sprayed so that the pattern can be recognized in the digital image correlation analysis to be described later, and the speckle pattern may be unevenly formed.

In one example, the speckle pattern is made by irregularly forming dots of 1 to 10 μm diameter on a thin film specimen. At this time, it is preferable that the dot size of the speckle pattern is uniform. In another example, the number of dots of the speckle pattern may be 50 to 300/cm$^2$ or 100 to 200/cm$^2$. If the number of dots of the speckle pattern exceeds 50/cm$^2$ or 300/cm$^2$, it may be difficult to recognize patterns before/after transformation. Hence, the number of dots of the speckle pattern is preferably 50 to 300/cm$^2$.

In another example, the speckle pattern formed on the thin film specimen has fluidity. In the digital image correlation analysis to be described later, the length strain rate (L/D) for the diameter of the speckle pattern is measured. Only when the speckle pattern has fluidity, the diameter of the speckle pattern before deformation may be changed.

Therefore, it is preferable that the paint is sprayed into the surface of the thin film specimen to form a pattern and a tensile test is performed before the speckle pattern is dried. Specifically, the method may include a step of measuring tensile strength of the thin film specimen within 3 to 10 minutes after forming a pattern by spraying paint on the surface of the thin film specimen.

Next, a step of measuring a tensile strength of a thin film specimen by applying tensile force in directions opposite to each other in a state that a grip portion of the thin film specimen having a speckle pattern is fixed is performed, and a step of analyzing a strain rate of the speckle pattern while applying tensile force to the thin film specimen is performed.

In the present invention, the step of measuring the tensile strength of the thin film specimen, the step of photographing the surface of the thin film specimen with a camera, and the step of performing digital image correlation analysis by comparing the image before the photographing with the image after the photographing were classified, but these steps may be simultaneously performed. In one example, the tensile test of the thin film specimen is performed while the surface of the thin film specimen is photographed by a camera, and the digital image analysis may be simultaneously performed.

In one example, the grip portion of the thin film specimen is coupled with the tensile tester. At this time, in order for the grip portion of the thin film specimen to be easily coupled with the tensile tester, an adhesive such as a double-sided tape may be applied to the surface of the grip portion, and the thin film specimen may then be coupled with the tensile tester. Further, after setting the load of the tensile tester to zero, the loading rate was set to be less than 1 mm/min to thereby perform a tensile test. For example, the tensile strength of the thin film specimen can be measured by using the Micro Tension Tester (Instron 5943) with 1 KN Load Cell.

Further, the step of analyzing the strain rate of the speckle pattern includes: continuously and sequentially photographing a surface of thin film specimen with a camera; and analyzing the strain rate of the speckle pattern by using a digital image correlation (DIC) analysis scheme by comparing an image before photographing the surface with an image after photographing the surface.

In one example the image can be obtained by continuously photographing the surface of the thin film specimen while measuring the tensile strength. In one example, a method of obtaining an image may be performed by using a photographing device such as a digital camera, a high-speed camera, a camcorder, an optical microscope, a scanning electron microscope, or the like. Preferably, a CCD camera may be a CCD camera that can continuously photograph the surface of the thin film specimen.

On the other hand, since the speckle pattern formed on the thin film specimen should have fluidity, paint is preferably sprayed into the surface of the thin film specimen, and the tensile test is preferably performed for 3 to 10 minutes. Specifically, paint is sprayed on the surface of the thin film specimen to form a pattern, and a tensile test may then be performed for 3 to 10 minutes, 4 to 9 minutes, 5 to 8 minutes, or 6 to 7 minutes. If a tensile test is performed within times less than 3 minutes after forming a speckle pattern, the formed speckle pattern has fluidity, but when the tensile test is performed, it may flow down in a gravity direction, and if the tensile test is performed after forming the speckle pattern for time exceeding 10 minutes, the formed speckle pattern may be dried so that even if tensile force is applied to the thin film specimen, the length of the speckle pattern is not changed, thereby making it difficult to measure the length strain rate (L/D) for the diameter of the speckle pattern to be described later.

In one example, the thin film specimen, on which speckle pattern is formed, is photographed by a CCD camera, and the movements before and after deformation of the speckle pattern of a certain region are compared and analyzed by using the digital image correlation analysis scheme, to thereby measure the strain rate and displacement. The strain rate of the speckle pattern may be analyzed by using a general digital image correlation analysis. Specifically, a pattern corresponding to reference image data in each loading state is selected based on the initial estimation value for the displacement of each point from the speckle pattern of image data. The x-axis direction displacement and the y-axis direction displacement can be evaluated by obtaining the optimal matching state of a subset pixel at a reference state and a subset pixel at a load state. The optimal match is obtained by setting an error function given as a gray level representing a subset to be minimized. This method is to analyze the gray level intensity, which is optionally distributed, and optimize the gray level strength between digital images of other time zones in which the deformation occurred.

In one example, the digital image correlation analysis according to the present invention is characterized in measuring the length strain rate (L/D) for the diameter of the speckle pattern formed on the thin film specimen.

When the tensile test is performed for the thin film specimen, the diameter of a speckle pattern having fluidity is deformed depending on the tensile direction, and particularly, the strain rate (L/D) for a portion, on which stress is concentrated, may be large.

In another example, the step of analyzing the strain rate includes: predicting a broken portion of the thin film specimen by distinguishing regions and comparing a length strain rate (L/D) for an area of the speckle pattern for each region. As described above, when performing a tensile test for the thin film specimen, the portion where the stress of the thin film specimen is concentrated may have a large length strain rate (L/D) for the diameter of the speckle pattern, and the thin film specimen may be broken at a position where the length strain rate (L/D) for the diameter of the speckle pattern is the largest. Namely, the portion where the thin film specimen is broken may be predicted by comparing the strain rate (L/D) of the speckle pattern for each region. Accordingly, the reliability of the physical properties of the thin film specimens can be increased. FIG. 3 is a schematic diagram showing a thin film specimen according to an embodiment of the present invention. As illustrated in FIG. 3, in the thin film specimen on which the speckle pattern is formed, a length ratio (a:b) of a width (a) of a parallel portion to a width (b) of the grip portion is in a range of 1:2 to 6, and a length ratio (c:d) of a gauge length (c) of the thin film specimen to a total length (d) of the thin film specimen is in a range of 1:4 to 7.

In one example, the length ratio (a:b) of the width (a) of the parallel portion to the width (b) of the grip portion may be in a range of 1:2 to 6, or 1:3 to 5. For example, the length ratio (a:b) of the width (a) of the parallel portion to the width (b) of the grip portion (a: b) may be 1:4. However, if the width (b) of the grip portion is less than twice the width (a) of the parallel portion, the width (b) is so small that the stress is concentrated on the grip portion of the thin film specimen, and a portion, which does not correspond to the gauge length of the thin film specimen, may be broken. In addition, when the width (b) of the grip portion exceeds 6 times the width (a) of the parallel portion, the width difference between the parallel portion and the grip portion of the thin film specimen is so large that a portion, which does not correspond to the gauge length of the thin film specimen, may be broken as described above.

In one example, the width (a) of the parallel portion (a) of the thin film specimens may range from 8 to 12 mm, from 8.5 to 11.5 mm, 9 to 11 mm, or from 9.5 to 10.5 mm, or may be 10 mm. Further, the width (b) of the grip unit may range from 16 to 72 mm, from 18 to 66 mm, from 20 to 60 mm, from 30 to 50 mm, or from 35 to 45 mm, or 40 mm. For example, the width (a) of the parallel portion of the thin film specimens may be 10 mm, and the width (b) of the grip portion may be 40 mm.

In another example, the length ratio (c:d) of the gauge length (c) of thin film specimen to the total length (d) of the thin film specimen may be in a range of 1:4 to 7, 1:4.5 to 6.5, or 1:5 to 6. For example, the length ratio (c:d) of the gauge length (c) of the thin film specimen to the total length (d) may be 1:5. If the total length (d) of the thin film specimen is less than 4 times the gauge length (c) or is greater than 7 times the gauge length (C), the stress is concentrated on the grip portion of the specimen at the time of the tensile test so that a portion, which does not correspond to the gauge length of the thin film specimen, may be broken.

In one example, the gauge length (c) of the thin film specimens may be in a range of 50 to 70 mm, 53 to 67 mm, 55 to 65 mm, or 58 to 62 mm, or may be 60 mm. Further, the total length (d) of the thin film specimens may range from 200 to 500 mm, from 230 to 450 mm, from 260 to 400 mm, or from 280 to 350 mm, or may be 300 mm. For example, the gauge length (c) of the thin film specimens is about 60 mm, and the total length (d) of the thin film specimens may be about 300 mm.

In another example, the ratio of the width (a) of the thin film specimen to the gauge length (c) may range from 1:5 to 7, from 1:5.3 to 6.7, or from 1:5.6 to 6.3. For example, the ratio of the width (a) of the parallel portion of the thin film specimen to the gauge length (c) may be 1:6. If gauge length (c) of the thin film specimen is less than 5 times the width (a) of the parallel portion or is greater than 7 times the width (a) of the parallel portion, the gauge length (c) compared to the width (a) of the parallel portion may be too short or too long to perform a tensile test. Therefore, the ratio of the width (a) of the parallel portion of the thin film specimen to the gauge length (c) is preferably in the above-described range.

In further another example, the thin film specimen includes a first shoulder portion and a second shoulder portion where a curvature is formed on an outer surface and an inner surface between a parallel portion and a grip portion, respectively, and the first and second shoulder portions satisfy formula 1 below:

$$|R_1/R_2| \leq 0.1 \qquad\qquad \text{[Formula 1]}$$

In formula 1, $R_1$ represents the radius of curvature of a first shoulder portion and is in a range of 23 to 27 mm. $R_2$ represents the radius of curvature of a second shoulder portion and is in a range of 23 to 27 mm.

Herein, as the first shoulder portion and the second shoulder portion satisfy Formula 1, the stress of the parallel portion may be uniformly distributed in the thin film specimen. As such, an abnormal damage can be suppressed when the tensile test of the thin film specimen is performed.

The radius of curvature of the first shoulder portion may range from 23 to 27 mm, and may range from 24 to 26 mm or 25 mm. Further, the radius of curvature of the second shoulder portion may range from 23 to 27 mm, and may range from 24 to 26 mm or 25 mm. If the radius of curvature of the first shoulder portion and the second shoulder portion is less than 23 mm, the stress can be concentrated on the grip portion, so that when a tensile test for a thin film specimen is performed, the grip portion, not the parallel portion, may break. In addition, when the radius of curvature of the first shoulder portion and the second shoulder portion exceeds 27 mm, the area of the grip portion is widened or becomes narrow, and the stress can be concentrated on the grip portion. Therefore, it is preferable that the first shoulder portion and the second shoulder portion have a radius of curvature in the above-described range.

Further, [Formula 1] means that the difference in the radius of curvature between $R_1$ and $R_2$ is very small, and if it goes beyond the numerical value in Formula 1, the difference in the radius of curvature between $R_1$ and $R_2$ may make it difficult to evenly distribute stress to the parallel portion. Therefore, $R_1$ and $R_2$ preferably satisfy formula 1.

In another example, the thin film specimen grip portion of the present invention may include a non-slip protrusion on the surface. The non-slip protrusion is used to allow the thin film specimen grip portion to be easily coupled to the tensile tester and is used to prevent the thin film specimen from being detached from the tensile tester during a tensile test. In one example, the non-slip protrusion can be formed on the grip portion in the tensile direction and the vertical direction. In another example, an adhesive such as a double-sided tape may be applied to the surface of the grip portion.

In addition, the present invention provides a thin film specimen for a tensile test.

In one example, a thin film specimen for a tensile test is provided. Herein, a length ratio (a:b) of a width (a) of a parallel portion to a width (b) of a grip portion is in a range of 1:3 to 6, and a width of a parallel portion of the thin film specimen is in a range of 8 to 12 mm on average, a length ratio (c:d) of a gauge length (c) to a total length (d) of the thin film specimen is in a range of 1:4 to 7, and the gauge length of the thin film specimen is in a range of 50 to 70 mm on average, and a speckle pattern is formed on a surface of the thin film specimen.

In one example, the length ratio (a:b) of the width (a) of the parallel portion to the width (b) of the grip portion may be in a range of 1:2 to 6, or 1:3 to 5. For example, the length ratio (a:b) of the width (a) of the parallel portion to the width (b) of the grip portion (a:b) may be 1:4. However, if the width (b) of the grip portion is less than twice the width (a) of the parallel portion, the width (b) is so small that the stress is concentrated on the grip portion of the thin film specimen, and a portion, which does not correspond to the gauge length of the thin film specimen, may be broken. In addition, when the width (b) of the grip portion exceeds 6 times the width (a) of the parallel portion, the width difference between the parallel portion and the grip portion of the thin film specimen is so large that a portion, which does not correspond to the gauge length of the thin film specimen, may be broken as described above.

In another example, the width (a) of the parallel portion (a) of the thin film specimens may range from 8 to 12 mm, from 8.5 to 11.5 mm, 9 to 11 mm, or from 9.5 to 10.5 mm, or may be 10 mm. Further, the width (B) of the grip unit may range from 16 to 72 mm, from 18 to 66 mm, from 20 to 60 mm, from 30 to 50 mm, or from 35 to 45 mm, or 40 mm. For example, the width (a) of the parallel portion of the thin film specimens may be 10 mm, and the width (b) of the grip portion may be 40 mm.

In one example, the length ratio (c:d) of the gauge length (c) of thin film specimen to the total length (d) of the thin film specimen may be in a range of 1:4 to 7, 1:4.5 to 6.5, or 1:5 to 6. For example, the length ratio (c:d) of the gauge length (c) of the thin film specimen to the total length (d) may be 1:5. If the total length (d) of the thin film specimen is less than 4 times the gauge length (c) or is greater than 7 times the gauge length (C), the stress is concentrated on the grip portion of the specimen at the time of the tensile test so that a portion, which does not correspond to the gauge length of the thin film specimen, may be broken.

In one example, the gauge length (c) of the thin film specimens may be in a range of 50 to 70 mm, 53 to 67 mm, 55 to 65 mm, or 58 to 62 mm, or may be 60 mm. Further, the total length (d) of the thin film specimens may range from 200 to 500 mm, from 230 to 450 mm, from 260 to 400 mm, or from 280 to 350 mm, or may be 300 mm. For example, the gauge length (c) of the thin film specimens is about 60 mm, and the total length (d) of the thin film specimens may be about 300 mm.

In another example, the ratio of the width (a) of the thin film specimen to the gauge length (c) may range from 1:5 to 7, from 1:5.3 to 6.7, or from 1:5.6 to 6.3. For example, the ratio of the width (a) of the parallel portion of the thin film specimen to the gauge length (c) may be 1:6. If gauge length (c) of the thin film specimen is less than 5 times the width (a) of the parallel portion or is greater than 7 times the width (a) of the parallel portion, the gauge length (c) compared to the width (a) of the parallel portion may be too short or too long to perform a tensile test. Therefore, the ratio of the width (a) of the parallel portion of the thin film specimen to the gauge length (c) is preferably in the above-described range.

In further another example, the thin film specimen includes a first shoulder portion and a second shoulder portion where a curvature is formed on an outer surface and an inner surface between a parallel portion and a grip portion, respectively, and the first and second shoulder portions satisfy formula 1 below:

$$|R_1/R_2| \leq 0.1 \qquad\qquad \text{[Formula 1]}$$

In formula 1, $R_1$ represents the radius of curvature of a first shoulder portion and is in a range of 23 to 27 mm. $R_2$ represents the radius of curvature of a second shoulder portion and is in a range of 23 to 27 mm.

Herein, as the first shoulder portion and the second shoulder portion satisfy Formula 1, the stress of the parallel portion may be uniformly distributed in the thin film specimen. As such, an abnormal damage can be suppressed when the tensile test of the thin film specimen is performed.

The radius of curvature of the first shoulder portion may range from 23 to 27 mm, and may range from 24 to 26 mm or 25 mm. Further, the radius of curvature of the second shoulder portion may range from 23 to 27 mm, and may range from 24 to 26 mm or 25 mm. If the radius of curvature of the first shoulder portion and the second shoulder portion is less than 23 mm, the stress can be concentrated on the grip portion, so that when a tensile test for a thin film specimen is performed, the grip portion, not the parallel portion, may break. In addition, when the radius of curvature of the first shoulder portion and the second shoulder portion exceeds 27 mm, the area of the grip portion is widened or becomes narrow, and the stress can be concentrated on the grip portion. Therefore, it is preferable that the first shoulder portion and the second shoulder portion have a radius of curvature in the above-described range.

Further, the thin film specimen grip portion of the present invention may include a non-slip protrusion on the surface. The non-slip protrusion is used to allow the thin film specimen grip portion to be easily coupled to the tensile tester and is used to prevent the thin film specimen from being detached from the tensile tester during a tensile test. In one example, the non-slip protrusion can be formed on the grip portion in the tensile direction and the vertical direction. In another example, an adhesive such as a double-sided tape may be applied to the surface of the grip portion.

In another example, a speckle pattern formed on the surface of the thin film specimen in case of applying physical property evaluation has fluidity. As described above, in the digital image correlation analysis, the length strain rate (L/D) for the diameter of the speckle pattern is measured. Only when the speckle pattern has fluidity, the diameter of the speckle pattern before deformation may be changed.

Hereinafter, the contents of the present invention are described through examples and drawings, but the following examples are used to illustrate the present invention, and the scope of the present invention is not limited by the scope of the examples and the drawings.

EXAMPLES

Example 1

Preparation of Thin Film Specimen

A thin film specimen was prepared by cutting a thick aluminum alloy having a thickness of about 20 μm using a press cutter. At this time, the thin film specimen was cut according to the following conditions (see FIG. 4).

Width (a) of parallel unit: 10 mm
Width (b) of grip portion: 40 mm
Gauge length (c) of thin film specimen: 60 mm
Total length (d) of thin film specimen: 300 mm
Radius of curvature ($R_1$, $R_2$) of first shoulder portion and second shoulder portion: 25 mm
Formation of Speckle Pattern An OHP film was attached to opposite sides of the grip portion of the thin film specimen. Then, a central display line perpendicular to the horizontal portion of the specimen was indicated. This is for grip and sample alignment of a tensile tester. Further, a double-sided tape was attached to the grip portion of the thin film specimen. The double-sided tape was attached to the front and back of the grip portion.

Thereafter, the white pigment was sprayed on the front surface of the thin film specimen at a certain distance to thereby be uniformly applied to the surface of the test piece, which was then completely dried, and the black paint was used to thereby form a black speckle pattern.

Example 2

A thin film specimen was prepared by cutting a polyethylene substrate having a thickness of about 15 μm to the same size as that in Example 1 using a press cutter.

Then, a speckle pattern was formed in the same manner as in Example 1. Herein, a white pigment was not applied to the thin film specimen, and a black speckle pattern was formed using a black paint.

Example 3

A thin film, on which graphite was applied, was prepared on opposite surfaces of a copper thin film having a thickness of about 10 μm. Then, the thin film specimen was prepared by cutting the thin film specimen to the same size as in Example 1. At this time, the thickness of the thin film specimen was about 20 μm.

Then, a speckle pattern was formed in the same manner as in Example 1. However, white paint was sprayed on a thin film specimen to form a white speckle pattern.

Comparative Example

A thin film specimen was prepared by cutting a thick aluminum alloy having a thickness of about 0.5 μm using a press cutter. At this time, the thin film specimen was cut into the ASTM E345 standard specimen for metal thin films, and the cutting was performed based on the following specific conditions (see FIG. 1).

Width (a) of parallel unit: 12.5 mm
Width (b) of grip portion: 20 mm
Gauge length (c) of thin film specimen: 60 mm
Total length (d) of thin film specimen: 200 mm
Radius of curvature ($R_2$) of shoulder portion: 19 mm

Experimental Example

The thin film specimens prepared in Example 1 and Comparative Example 1 were mounted on a micro tensile tester (INSTRON 5943), respectively, and the tensile strength of the thin film specimens was measured. On the other hand, after removing the release paper of the double-sided tape attached to the grip portion of Example 1, the thin film specimen was coupled with the tensile tester, and a speckle pattern was formed on the thin film specimen and the coupling was performed after 5 minutes. Further, the load was set to "0", the speed was set to be less than 1 mm/min in the tensile direction, and the temperature was maintained at a room temperature. At the same time, the deformation images of the speckle pattern were continuously taken by a CCD camera, and the strain rate of the speckle pattern was analyzed by using a DIC analysis program.

Then, the results are shown in FIGS. 5 to 8.

FIG. 5 is a photograph showing a portion which has been broken when a tensile test for the thin film specimen of example 1 has been performed with a tensile tester, and FIG. 6 is a diagram illustrating a speckle pattern in a photograph taken right before the thin film specimen is broken.

Referring to FIG. 5, in the example 1, it is seen that the specimen was broken within the gauge length of the thin film specimen, and referring to FIG. 6, it is seen that the speckle pattern of the thin film specimen is deformed. Particularly, it is seen that the length strain rate (L/D) for the diameter of the speckle pattern formed on a broken portion is greater than that for the diameter of the speckle pattern formed on the grip portion.

FIG. 7 is a photograph showing a portion which has been broken when a tensile test for the thin film specimen of comparative example 1 has been performed with a tensile tester, and FIG. 8 is a diagram illustrating a speckle pattern in a photograph taken right before the thin film specimen is broken. Referring to FIG. 7, in the Comparative Example 1, the grip portion outside the gauge length was broken. Further, referring to FIG. 8, it can be confirmed that the length strain rate (L/D) for the diameter of the speckle pattern was large in the grip portion which was broken.

In the above, the present invention has been described in more detail through the drawings and examples. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

The invention claimed is:

1. A method for evaluating physical properties of a thin film specimen, comprising:
   measuring a tensile strength of a thin film specimen by applying tensile force in directions opposite to each other in a state that a grip portion of the thin film specimen having a speckle pattern is fixed; and
   analyzing a strain rate of the speckle pattern while applying tensile force to the thin film specimen,
   wherein, in the thin film specimen on which the speckle pattern is formed, a width (a) of a parallel portion is 10 mm, a width (b) of the grip portion is 40 mm, a gauge length (c) of the thin film specimen is 60 mm, and a total length (d) of the thin film specimen is 300 mm,
   wherein the thin film specimen includes a first shoulder portion and a second shoulder portion where a curvature is formed on an outer surface and an inner surface between a parallel portion and a grip portion, respectively, and
   wherein a radius of curvature of both the first shoulder portion and a radius of curvature of the second shoulder portion is 25 mm.

2. The method of claim 1, wherein the analyzing the strain rate of the speckle pattern comprises:
   continuously and sequentially photographing a surface of the thin film specimen with a camera;
   wherein the analyzing the strain rate of the speckle pattern is conducted by using a digital image correlation (DIC) analysis scheme by comparing an image before the photographing the surface with an image after the photographing the surface.

3. The method of claim 2, wherein the analyzing the strain rate comprises:
   measuring a length strain rate (L/D) for a diameter of the speckle pattern.

4. The method of claim 2, wherein the analyzing the strain rate comprises:
   predicting a broken portion of the thin film specimen by distinguishing regions and comparing a length strain rate (L/D) for an area of the speckle pattern for each region.

5. The method of claim 1, wherein a grip portion of the thin film specimen includes a non-slip protrusion.

6. The method of claim 1, wherein a number of dots per $cm^2$ of the speckle pattern formed on the thin film specimen is in a range of 50 to 300.

7. The method of claim 1, further comprising: forming a speckle pattern on a surface of the thin film specimen,
   wherein the forming the speckle pattern comprises spraying a paint having a color, which is in contrast to a color of the thin film specimen, on the surface of the thin film specimen.

8. The method of claim 7, wherein the speckle pattern formed on the thin film specimen has fluidity.

9. The method of claim 8, further comprising: measuring tensile strength of the thin film specimen within 3 to 10 minutes after forming a pattern by spraying paint on the surface of the thin film specimen.

10. The method of claim 1, wherein the thin film specimen is an electrode, a current collector or a separator of a secondary battery.

11. The method of claim 1, wherein a thickness of the thin film specimen is 10 to 30 μm.

12. A thin film specimen for a tensile test, wherein a width (a) of a parallel portion is 10 mm, a width (b) of a grip portion is 40 mm, a gauge length (c) of the thin film specimen is 60 mm, and a total length (d) of the thin film specimen is 300 mm, and
   wherein the thin film specimen includes a first shoulder portion and a second shoulder portion where a curvature is formed on an outer surface and an inner surface between a parallel portion and a grip portion, respectively,
   wherein a radius of curvature of both the first shoulder portion and a radius of curvature of the second shoulder portion is 25 mm, and
   wherein a surface of the thin film specimen comprises a speckle pattern.

13. The thin film specimen of claim 12, wherein a speckle pattern formed on the surface of the thin film specimen in case of applying physical property evaluation has fluidity.

* * * * *